United States Patent Office 3,466,290
Patented Sept. 9, 1969

---

3,466,290
9,10-DIHYDRO-4H-BENZO[4,5]CYCLOHEPTA[1,2-b] THIOPHENE ETHERS
Ernst Jucker, Ettingen, Anton Ebnother, Reinach, Basel-Land, and Jean-Michel Bastian, Birsfelden, Switzerland, assignors to Sandoz Ltd (also known as Sandoz A.G.), Basel, Switzerland
No Drawing. Filed Jan. 31, 1967, Ser. No. 612,799
Claims priority, application Switzerland, Feb. 2, 1966, 1,440/66; Feb. 16, 1966, 2,259/66
Int. Cl. C07d *43/10*
U.S. Cl. 260—292                    5 Claims

ABSTRACT OF THE DISCLOSURE

The present invention provides benzocyclohepta-thiophene ethers of formula:

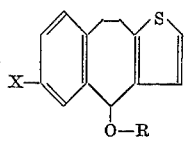

in which X is hydrogen or chlorine and R is nortropanyl-(3) substituted on the nitrogen atom by a lower alkyl of 1–4 carbon atoms, or alkylaminoethyl, in which alkyl is of 1–4 carbon atoms, and their acid addition salts. These compounds exhibit histamine, acetylcholine and serotonin inhibiting effects, as well as blood pressure lowering effects. The production of these compounds is further described.

---

The present invention relates to new basic benzocyclohepta-thiophene ethers and a process for their production.

The present invention provides benzocyclohepta-thiophene ethers of general Formula I,

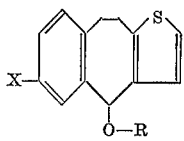

in which
X signifies a hydrogen or chlorine atom, and
R signifies a nortropanyl-(3)- radical substituted on the nitrogen atom by a lower alkyl radical containing 1–4 carbon atoms, or an alkylaminoethyl radical in which the alkyl radical contains 1 to 4 carbon atoms, and their acid addition salts.

The present invention further provides a process for the production of the compounds of general Formula I, characterized in that a benzocyclohepta-thiophene derivative of general Formula II,

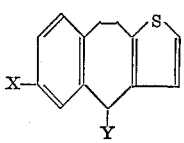

in which
X has the above significance, and
Y signifies either a hydroxy radical or a halogen atom or an aryl- or alkyl-sulphonyloxy radical, is reacted with a compound of general Formula III, <div align="center">Y—R      III</div> in which
R has the above signifiance, and

Y signifies the hydroxyl radical when Y in Formula II signifies a halogen atom or an aryl- or alkyl-sulphonyloxy radical, or
oxy radical, or
Y signifies a halogen atom or an aryl- or alkyl-sulphonyloxy radical when Y in Formula II signifies the hydroxyl radical, in an anhydrous solvent and in the presence of an acid binding agent, at the boiling temperature of the solvent, and the resulting compound of general Formula I is optionally salified.

The compounds of Formula II are also new and together with the process for their production, also form part of the present invetnion. The compounds of Formula II, in which Y signifies a hydroxyl radical, may be produced from the corresponding 9,10-dihydro-4H-benzo[4,5]cyclohepta[1,2-b]thiophen-4-one by reduction with zinc and sodium hydroxide, with a complex metal hydride, e.g. sodium borohydride or lithium aluminium hydride, or by catalytic hydrogenation, e.g. in the presence of a palladium catalyst at an elevated pressure.

The compounds of Formula II, in which Y signifies a halogen atom or an aryl- or alkyl-sulphonyloxy radical, are obtained from the corresponding hydroxy compounds by treating with a hydrogen halide, a thionyl halide or an aryl- or alkyl-sulphonyl halide, e.g. p-toluenesulphonyl chloride or methanesulphonyl chloride.

Examples of compounds of Formula II which may, therefore, be used as starting materials are 9,10-dihydro-4H-benzo[4,5]cyclohepta[1,2-b]thiophene-4-ol and the corresponding 6-chloro derivative, 4-halogen- and 4-sulphonyloxy - 9,10 - dihydro - 4H - benzo[4,5]cyclohepta-[1,2-b]thiophene, e.g. 4-chloro- and 4,6-dichloro-9,10-dihydro-4H-benzo[4,5]cyclohepta[1,2-b]thiophene or 4-(p-toluenesulphonyloxy) - 9,10 - dihydro - 4H - benzo[4,5]-cyclohepta[1,2-b]thiophene.

Examples of compounds of Formula III which may be used as starting materials are: tropine, 2-methyl-amino-ethanol and 2-isopropylamino-ethanol, their aryl- and alkyl-sulphonyl esters, e.g. p-toluenesulphonyl ester, and the corresponding chlorides or bromides.

One method of effecting the process of the invention is as follows: A solution of a benzocyclohepta-thiophen-4-ol in absolute benzene is saturated with dry hydrogen chloride at a temperature of 10–20° C., the solution is dried over calcium chloride and filtered. Alternatively the calculated amount of thionyl chloride may be added dropwise and stirring effected at room temperature for about 30 minutes. 4-chloro-9,10-dihydro-4H-benzo[4,5]cyclohepta[1,2-b]thiophene is unstable and is used for further reaction in the solution without purification. The 4,6-dichloro derivative is, however, stable, and may be isolated and purified by crystallization. A solution of a compound III, in which Y signifies the hydroxyl radical, and an acid binding agent, e.g. sodium carbonate, potassium carbonate or triethylamine, or an excess of the compound III, in absolute xylene is then added at the boil to the solution of the 4-chloro derivative and heating to the boil is effected for a further ½ to 5 hours. After cooling, the solution is shaken out with water.

The benzocyclohepta-thiophen-4-ol is produced, for example, by dissolving the corresponding ketone in boiling ethanol. Sodium hydroxide and zinc powder are then added portionwise to the solution, and the reaction mixture is heated to the boil for 1 to 2 hours, after which the inorganic residue is separated. After acidifying the filtrate, the benzocyclohepta-thiophen-4-ol may be isolated and purified in manner known per se. The desired carbinol may also be obtained by reduction with a complex metal hydride. Thus, for example, aqueous sodium borohydride and sodium hydroxide are added to a solution of the ketone in methanol and the mixture is stirred at room temperature for 2 to 5 hours and subsequently at 60° C. for 1 to 2 hours, after which the carbinol is isolated from the reaction mixture and purified in manner known per se.

In accordance with another embodiment of the invention the process is effected as follows:

A benzocyclohepta-thiophen-4-ol is slowly added to a suspension of sodium, potassium or lithium amide or hydride in absolute benzene and the resulting solution is subsequently heated at reflux for 1 to 4 hours. A solution of an ester of Formula III, in which Y signifies a halogen atom or an aryl- or alkyl-sulphonyloxy radical, in absolute benzene is then added dropwise at the boil and heating to the boil is effected for 3 to 10 hours. After cooling, the solution is shaken out with water. The resulting compound of Formula I is isolated from the reaction mixture and purified in manner known per se, e.g. by distillation in a high vacuum and/or conversion into a suitable salt.

The compounds of Formula I are basic compounds; with inorganic or organic acids they form stable salts which are crystalline at room temperature. Examples of acids for acid addition salt formation with compounds I are: hydrochloric, hydrobromic, phosphoric, sulphuric, malonic, fumaric, maleic, tartaric, malic, hexahydrobenzoic and p-toluenesulphonic acid.

In tests effected with animals the compounds of Formula I exhibit histamine, acetylcholine and serotonin inhibiting effects. 6 - chloro - 4 - (3α-tropanyloxy)-9,10-dihydro-4H-benzo[4,5]cyclohepta[1,2-b]thiophene is especially characterized by a very pronounced acetylcholine inhibiting effect. This compound also potentiates the effect of adrenalin on the blood pressure of dogs. The compounds of Formula I furthermore have a strong broncholytic activity. This property is especially pronounced in the case of 6-chloro-4-(2-isopropylamino-ethoxy)-9,10 - dihydro 4H-benzo[4,5]cyclohepta[1,2-b]thiophene. This compound potentiates the effect of tyramine on the blood pressure of dogs. The compounds of Formula I furthermore have blood pressure lowering effects.

The compounds of the invention are indicated for use in the treatment of various allergic illnesses and asthmatic conditions, in the treatment of vagotonic disorders (e.g. spasms of the smooth muscles, hypersecretion, bradycardia, gastrointestinal dysfunction, spasms of the urogenital tract) and in the treatment of hypertonia. The compounds are preferably administered in the form of their water-soluble, physiologically tolerated salts, in a daily dose of 5–100 mg., 1 to 3 times per day.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are:

for tablets and dragées: lactose, starch, talc and stearic acid;

for injectable solutions: water, alcohols, glycerin and vegetable oils.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade. The melting points are uncorrected.

EXAMPLE 1

4-(3α-tropanyloxy)-9,10-dihydro-4H-benzo[4,5] cyclohepta[1,2-b]thiophene 9.0 g. of 9,10-dihydro-4H-benzo[4,5]cyclohepta[1,2-b] thiophen-4-ol are dissolved at 40° in 240 ml. of absolute xylene and the resulting solution is saturated with dry hydrogen chloride at 10°. The solution is then dried twice over 10 g. of pulverized calcium chloride and filtration is effected. After the addition of a third portion of 10 g. of calcium chloride, the excess hydrogen chloride is removed at 15 mm. of Hg in an atmosphere of nitrogen (time: about 4 hours). The resulting solution is filtered through active charcoal and is added dropwise during the course of 1½ hours to a boiling suspension of 10.5 g. of tropine and 14 g. of sodium carbonate in 40 ml. of absolute xylene. The mixture is subsequently heated to the boil for a further half hour, cooling is effected, the insoluble portion is filtered off and washed with xylene. The combined xylene solutions are washed with water until the aqueous solution is neutral and are dried over magnesium sulphate.

Hydrogen maleate.—A solution of 4.8 g. of maleic acid in 140 ml. of ether is added to the resulting xylene solution. After standing for several hours at 0°, the solvent is decanted and the oily residue dissolved in methanol at room temperature. After the addition of 40 ml. of isopropanol, the methanol is evaporated at 30° under reduced pressure and cooling is effected to 0°. The precipitated hydrogen maleate is recrystallized once more from methanol/isopropanol and has a melting point of 151.5-152.5° with decomposition.

The 9,10 - dihydro - 4H - benzo[4,5]cyclohepta[1,2-b] thiophen-4-ol used as starting material may be produced as follows:

(I) 60.0 g. of sodium hydroxide are added portionwise to a solution of 50.0 g. of 9,10-dihydro-4H-benzo[4,5] cyclohepta[1,2-b]thiophen-4-one in 500 ml. of boiling 95% ethanol and heating to the boil is effected until a clear solution results. 90.0 g. of zinc powder are then added slowly portionwise and heating to the boil is effected for a further 1½ hours. The inorganic residue is filtered off, is washed with ethanol and the filtrate is concentrated by evaporation at reduced pressure. The solid residue is triturated with 200 ml. of water and the pH of the suspension is adjusted to 7 by the addition of dilute hydrochloric acid whilst cooling. The mixture is extracted several times with methylene chloride, the organic extracts are washed with water, dried over magnesium sulphate and the solvent is evaporated at reduced pressure. After recrystallization from hexane, pure 9,10-dihydro-4H-benzo[4,5]cyclohepta[1,2-b]thiophen-4-ol, having a melting point of 111–112°, is obtained.

(II) A solution of 35.2 g. of sodium borohydride in 130 ml. of water and 2.2 ml. of 38% sodium hydroxide is addded dropwise to a solution of 50.0 g. of 9,10-dihydro-4H-benzo[4,5]cyclohepta[1,2-b]thiophen-4-one in 900 ml. of methanol. The resulting solution is stirred at room temperature for 2½ hours and subsequently at 60° for 1½ hours, is then cooled and slowly diluted with 900 ml. of water whilst stirring. The precipitated product is filtered off, washed with dilute acetic acid and water and dried at 60° in a water jet vacuum. After recrystallizing several times from hexane, the resulting carbinal has a melting point of 111–112°.

EXAMPLE 2

6-chloro-4-(3α-tropanyloxy)-9,10-dihydro-4H-benzo [4,5]cyclohepta[1,2-b]thiophene (a) 4,6 - dichloro - 9,10-dihydro-4H-benzo[4,5]cyclohepta[1,2-b]thiophene.—A solution of 10.0 g. of 6-chloro-9,10 - dihydro - 4H-benzo[4,5]cyclohepta[1,2-b]thiophen-4-ol in 150 ml. of absolute benzene is saturated with dry hydrogen chloride at a temperature of 15–20°. The resulting water is then removed by drying over two portions of calcium chloride, the organic solution is filtered through active charcoal and the solvent evaporated at 40° and reduced pressure. After drying in a vacuum at 30–40° for several hours, the residue is recrystallized from ligroin (boiling point 80–110°). The analytically pure 4,6-dichloro - 9,10 - dihydro-4H-benzo[4,5]cyclohepta[1,2-b]thiophene has a melting point of 121–122° with decomposition.

(b) 6 - chloro - 4-(3α-tropanyloxy)-9,10-dihydro-4H-benzo[4,5]cyclohepta[1,2-b]thiophene.—A solution of 6.6 g. of 4,6-dichloro-9,10-dihydro-4H-benzo[4,5]cyclohepta[1,2-b]thiophene in 40 ml. of absolute xylene is added dropwise during the course of half an hour to a boiling solution of 5.0 g. of tropine and 10.0 g. of sodium carbonate in 30 ml. of absolute xylene and heating to the boil is subsequently effected for 1½ hours. After cooling, filtration is effected and the filtrate is washed thrice with water. The organic phase is then shaken out thrice, each time with 50 ml. of 1 N hydrochloric acid, the acid extract is made alkaline by the addition of sodium hydroxide at 10° and is shaken out with methylene chloride. The methylene chloride solutions are washed with water, dried over sodium sulphate and concentrated by evaporation.

Hydrogen maleate.—5.0 g. of the oily residue are dissolved in 25 ml. of acetone. 1.5 g. of maleic acid are added, heating is effected until a clear solution results and 10 ml. of isopropanol are then added. Acetone is subsequently removed by evaporation at reduced pressure and the resulting solution is allowed to stand at room temperature. The precipitated hydrogen maleate is filtered off and recrystallized from methanol/isopropanol. The analytically pure compound has a melting point of 194–197° with decomposition.

The 6 - chloro-9,10-dihydro-4H-benzo[4,5]cyclohepta[1,2-b]thiophen-4-ol used as starting material may be produced as follows:

(I) From 55.0 g. of 6-chloro-9,10-dihydro-4H-benzo[4,5]cyclohepta[1,2-b]thiophen-4-one, 500 ml. of 95% ethanol, 60.0 g. of sodium hydroxide and 90.0 g. of zinc powder, in a manner analogous to that described in Example 1(I). After recrystallization from ether/hexane pure 6-chloro-9,10-dihydro-4H-benzo[4,5]cyclohepto[1,2-b]thiophen-4-ol has a melting point of 131–133°.

(II) From 50.0 g. of 6-chloro-9,10-dihydro-4H-benzo[4,5]cyclohepta[1,2-b]thiophen-4-one in 800 ml. of methanol and 30.6 g. of sodium borohydride in 115 ml. of water and 2.0 ml. of 38% sodium hydroxide, and a manner analogous to that described in Example 1(II). Melting point 131–133° (from ether/hexane).

EXAMPLE 3

4-(2-methylaminoethoxy)-9,10-dihydro-4H-benzo[4,5]cyclohepta[1,2-b]thiophene 15.0 g. of 9,10 - dihydro - 4H - benzo[4,5]cyclohepta[1,2-b]thiophen-4-ol are dissolved in 350 ml. of xylene at 40° and the resulting solution is saturated with dry hydrogen chloride at 10°. The solution is then dried twice over 10 g. of pulverized calcium chloride and filtration is effected. After the addition of a third portion of 10 g. of calcium chloride, the excess hydrogen chloride is removed at 15 mm. of Hg in an atmosphere of nitrogen (time: about 4 hours). The resulting solution is filtered through active charcoal and is added dropwise during the course of 2 hours to a boiling solution of 5.6 g. of 2-methylamino-ethanol and 10 g. of sodium carbonate in 50 ml. of absolute xylene. Heating to the boil is subsequently effected for a further half hour, cooling is effected to 10° the insoluble material is filtered off and washed with xylene. The combined xylene solutions are washed with water, dried over magnesium sulphate and the solvent is evaporated at reduced pressure. The oily residue is subsequently distilled in a high vacuum, whereby 4-(2-methylaminoethoxy) - 9,10-dihydro-4H-benzo[4,5]cyclohepta[1,2-b]thiophene distils as a yellowish oil at 190–210°/0.1 mm. of Hg.

Hydrogen maleate.—3.6 g. of the base are dissolved in 15 ml. of isopropanol and a solution of 1.5 g. of maleic acid in 10 ml. of ethanol is added thereto. The precipitated hydrogen maleate is filtered off and recrystallized twice from ethanol/isopropanol. Melting point 124–126.5°.

EXAMPLE 4

6-chloro-4-(2-isopropylaminoethoxy)-9,10-dihydro-4H-benzo[4,5]cyclohepta[1,2-b]thiophene A solution of 4.2 g. of 2-isopropylaminoethanol in 10 ml. of absolute xylene is added dropwise at the boil to a solution of 5.3 g. of 4,6-dichloro-9,10-dihydro-4H-benzo[4,5]cyclohepta[1,2-b]thiophene in 60 ml. of absolute xylene and heating to the boil is effected for a further 3 hours. After cooling, the reaction mixture is washed several times with water, the organic phase is dried over sodium sulphate and the solvent evaporated at reduced pressure. The oily residue is then distilled in a high vacuum, whereby 6-chloro-4-(2-isoprophylaminoethoxy)-9,10 - dihydro-4H-benzo[4,5]cyclohepta[1,2-b]thiophene distils at 190–205°/0.05–0.1 mm. of Hg.

Hydrogen maleate.—5.0 g. of the distilled base are dissolved in 5 ml. of isopropanol and a solution of 1.75 g. of maleic acid in 5 ml. of isopropanol is added thereto. After the addition of a few drops of ether the solution is allowed to stand at room temperature for 2 to 3 hours and then in a refrigerator for several hours. The precipitated, analytically pure hydrogen maleate has a melting point of 125.5–127.5° with decomposition.

EXAMPLE 5

6-chloro-4-(2-isopropylaminoethoxy)-9,10-dihydro-4H-benzo[4,5]cyclohepta[1,2-b]thiophene 10.0 g. of 6-chloro-9,10-dihydro-4H-benzo[4,5]cyclohepta[1,2-b]thiophen-4-ol are slowly added to a suspension of 4.0 g. of sodium amide in 100 ml. of absolute benzene and the resulting solution is subsequently heated at reflux for 2 hours. A solution of 10.0 g. of 2-isopropylaminoethyl chloride in 50 ml. of absolute benzene is then added dropwise at the boil during the course of 15 minutes and heating to the boil is effected for a further 5 hours. After cooling, the reaction mixture is filtered through highly purified diatomaceous earth and the solvent is evaporated at reduced pressure. The oily residue is distilled in a high vacuum, whereby 6-chloro-4-(2-isopropylaminoethoxy)-9,10-dihydro - 4H - benzo[4,5]cyclohepta[1,2-b]thiophene distils at 190–205°/0.05–0.1 mm. of Hg.

EXAMPLE 6

6-chloro-4-(3α-tropanyloxy)-9,10-dihydro-4H-benzo[4,5]cyclohepta[1,2-b]thiophene A solution of 11.95 g. of 6-chloro-9,10-dihydro-4H-benzo[4,5]cyclohepta[1,2-b]thiophen-4-ol and 10.5 g. of p-toluenesulphonyl chloride in 50 ml. of absolute pyridine is stirred at room temperature for 5 hours. The pyridine is subsequently distilled off at 15 mm. of Hg and is completely removed azeotropically by adding water thrice, each time 100 ml. The residue is subsequently dissolved in 50 ml. of chloroform and the solution is shaken out thrice, each time with 50 ml. of water, dried over magnesium sulphate and concentrated by evaporation. 12.8 g. of tropine in 50 ml. of absolute xylene are added and the solution heated to the boil at reflux for half an hour. Cooling to room temperature is subsequently effected and 40 ml. of 1 N sodium hydroxide are added. The xylene phase is then separated and the aqueous phase shaken out twice more with ether, each time 30 ml. The combined xylene and ether extracts are washed with water until neutral, dried over magnesium sulphate and purified over animal charcoal. After distilling off the solvent, the oily residue is converted into the hydrogen maleate in a manner analogous to that described in Example 2. Melting point 194–197° (decomposition).

EXAMPLE OF A GALENICAL PREPARATION—TABLES

|  | G. |
|---|---|
| 6-chloro-4-(3α-tropanyloxy)-9,10-dihydro-4H-benzo[4,5]cyclohepta[1,2-b]thiophene hydrogen maleate | 0.0010 |
| Stearic acid | 0.0020 |
| Polyvinyl pyrrolidone | 0.0050 |
| Talcum | 0.0050 |
| Maize starch | 0.0100 |
| Lactose | 0.0270 |
| For a tablet of | 0.0500 |

What is claimed is:

1. A compound selected from the group consisting of a compound of the formula:

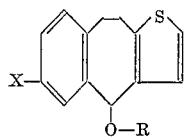

in which X is hydrogen or chlorine and R is nortropanyl-(3) substituted on the nitrogen atom by methyl, or alkylaminoethyl, in which alkyl is of 1–4 carbon atoms, and the pharmaceutically acceptable acid addition salts thereof.

2. The compound according to claim 1, in which the compound is 4-(3α-tropanyloxy)-9,10-dihydro-4H-benzo[4,5]cyclohepta[1,2-b]thiophene.

3. The compound according to claim 1, in which the compound is 6-chloro-4-(3α-tropanyloxy)-9,10-dihydro-4H-benzo[4,5]cyclohepta[1,2-b]thiophene.

4. The compound according to claim 1, in which the compound is 4-(2-methylaminoethoxy)-9,10-dihydro-4H-benzo[4,5]cyclohepta[1,2-b]thiophene.

5. The compound according to claim 1, in which the compound is 6-chloro-4-(2-isopropylaminoethoxy)-9,10-dihydro-4H-benzo[4,5]cyclohepta[1,2-b]thiophene.

References Cited

UNITED STATES PATENTS 3,351,625   11/1967   Harms _____ 260—292

OTHER REFERENCES

Burger: Medicinal Chemistry, vol. 1, Interscience, pp. 45–49 (1951).

JOHN D. RANDOLPH, Primary Examiner

ALAN L. ROTMAN, Assistant Examiner

U.S. Cl. X.R.

260—332.3; 424—265, 275